I. B. TURNER.
AUTOMOBILE SIGNAL.
APPLICATION FILED AUG. 28, 1917.

1,272,154.

Patented July 9, 1918.
3 SHEETS—SHEET 1.

INVENTOR
Ira B. Turner
by W. W. Williamson
Atty.

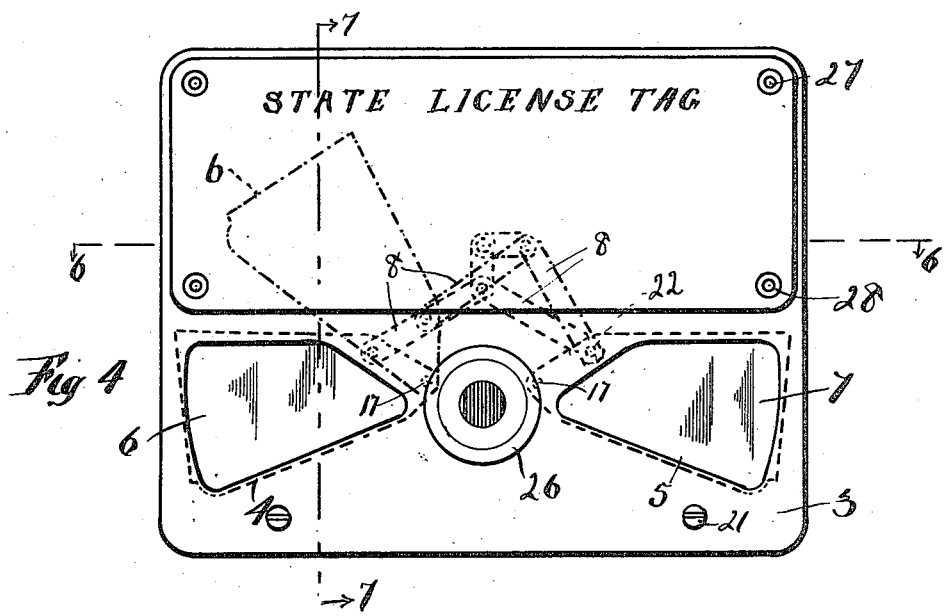
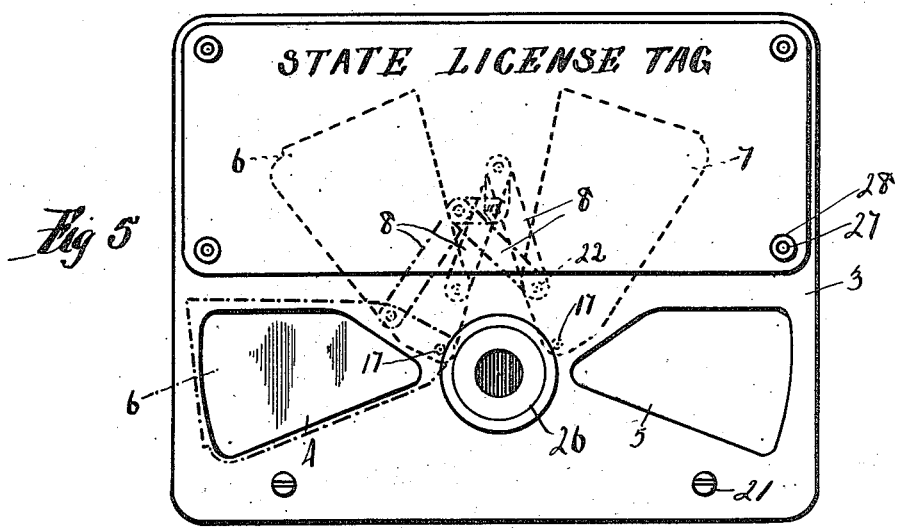

I. B. TURNER.
AUTOMOBILE SIGNAL.
APPLICATION FILED AUG. 28, 1917.
1,272,154.
Patented July 9, 1918.
3 SHEETS—SHEET 3.
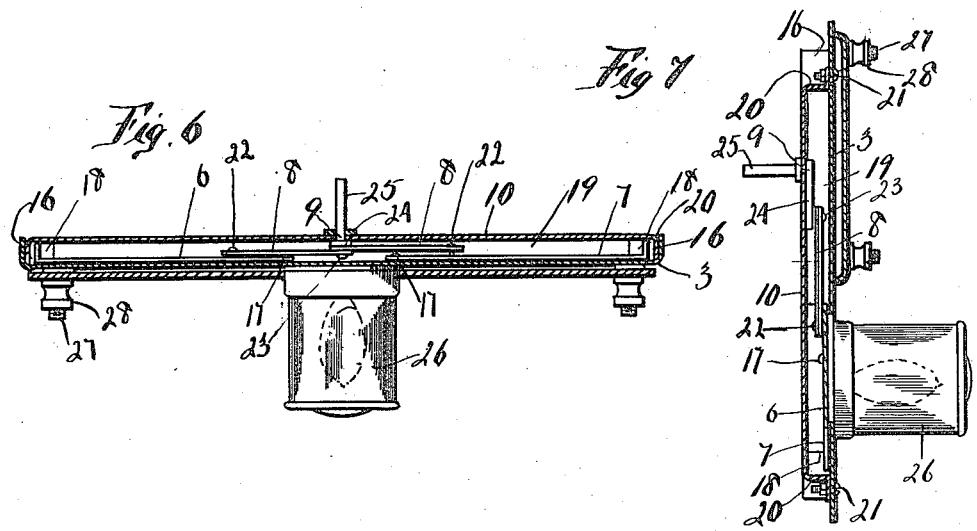
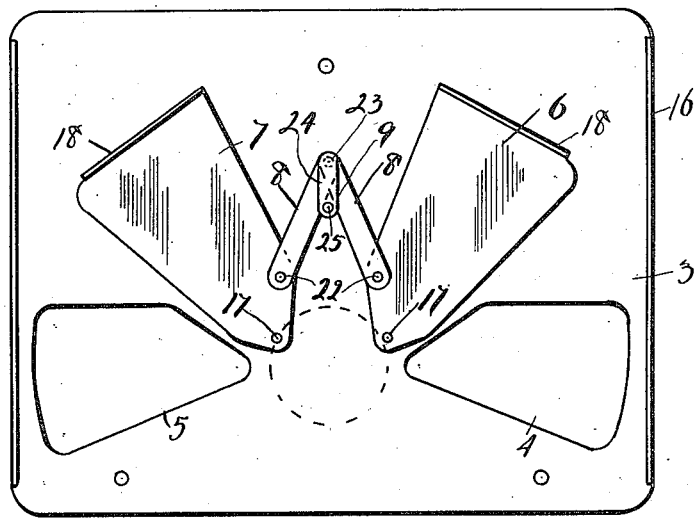
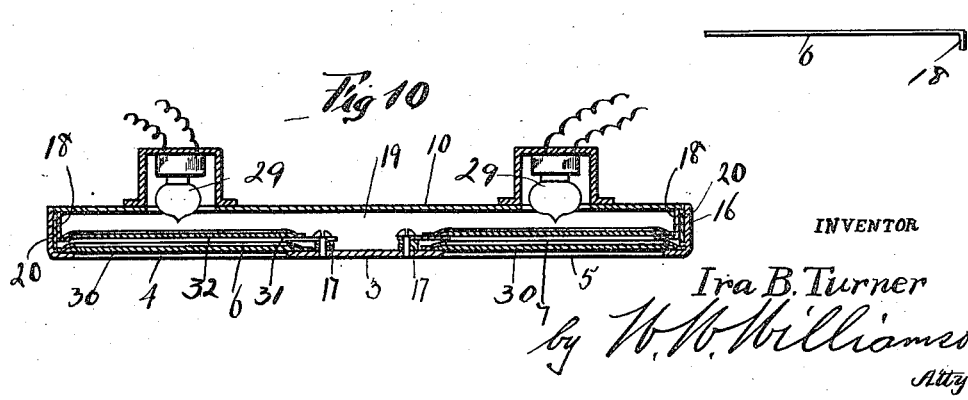
INVENTOR
Ira B. Turner
by W. W. Williamson
Atty.

UNITED STATES PATENT OFFICE.

IRA B. TURNER, OF PHILADELPHIA, PENNSYLVANIA.

AUTOMOBILE-SIGNAL.

1,272,154.      Specification of Letters Patent.      Patented July 9, 1918.

Application filed August 28, 1917. Serial No. 188,546.

*To all whom it may concern:*

Be it known that I, IRA B. TURNER, a citizen of the United States, residing at Philadelphia, in the county of Philadelphia and State of Pennsylvania, have invented new and useful Improvements in Automobile-Signals, of which the following is a specification.

My invention relates to new and useful improvements in automobile signals, and has for its object to provide an exceedingly simple and effective device of this character, whereby the operator of an automobile may signal to the traffic following his vehicle whether he intends to proceed, stop or turn to either the right or the left.

A further object of the invention is to provide a vehicle signal which will be exceedingly simple in construction, relatively inexpensive in the cost of manufacture, yet strong and durable, and one which may be readily and quickly applied to a vehicle of any construction.

Another object of the invention is to provide an automobile signal which may be built in the body of the vehicle and so combined therewith as to form a part thereof.

Another object of the invention is to provide an automobile signal which may be readily operated from the driver's seat through the medium of a flexible shaft.

A still further object of the invention is to provide an automobile signal consisting of two semaphores or signal arms pivoted within a housing having two openings through which the signals are given, both of said signal arms being connected by links with a single crank, the different positions of the crank arm moving the semaphores to their different signal positions.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which—

Fig. 4, is a front elevation of my improved signal showing it arranged within a housing which is adapted to be secured to any vehicle, the signal arms being in the stop position and illustrating in a dot and dash line the position of one of the semaphores when the other is being used to designate that the automobile is to be turned to the right.

Fig. 5, is a similar view, the signal arms being in the proceed position and showing in dot and dash lines, the position of one of the semaphores when the signal is to be given for turning to the left.

Fig. 6, is a section at the line 6—6 of Fig. 4.

Fig. 7, is a section at the line 7—7 of Fig. 4.

Fig. 8, is an inside rear elevation of the signal.

Fig. 9, is an edge view of one of the semaphores or signal arms; and

Fig. 10, is a horizontal sectional view of a slightly modified form of my invention on a line below the links which connects the signal arms to the crank.

Figure 1:
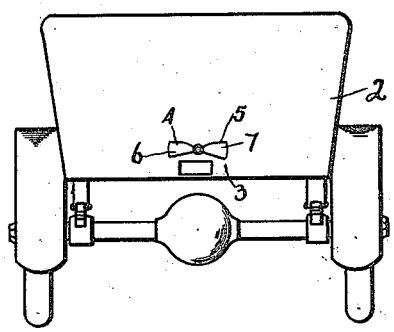
Figure 1, is a rear end view of an automobile, showing my improved signal applied thereto.

In carrying out my invention as here embodied 2 represents an automobile, and where the signal is to form a part thereof, a portion of the automobile body forms the outer or front wall 3 of the housing, said wall having two signal openings 4 and 5 therein which are arranged in a horizontal line and spaced apart a short distance.

To the front wall 3 of the housing are pivoted the semaphores or signal arms 6 and 7 in such position that they will move across the signal openings 4 and 5. The construction of these arms will be hereinafter more fully described.

Each signal arm or semaphore is connected by a link 8 with a crank 9, the shank of which passes through the back plate 10, said back plate acting as the bearing for said crank. To the end of the crank, projecting outside of the back plate of the housing is connected one end of a flexible shaft 11, which runs under or through the automobile to some convenient point adjacent the operator's seat, and the opposite end is connected to a crank handle 12, the latter being journaled in a suitable dial or disk 13 having designation marks 14 thereon, said designation marks representing the different positions of the semaphores or signal arms. I have here shown the dial as being attached to the steering wheel 15, but it will be readily understood that this may be fastened to the side of the vehicle body to the steering wheel post, or other suitable part of the vehicle, where the operator may readily reach the same.

In Figs. 4 to 8 inclusive, I have shown the signal constructed so that it may be readily applied to any vehicle and arranged in any suitable position, and in this form of the device, 3 represents the front plate or wall provided with rearwardly projecting side flanges 16 and having signal openings 4 and 5 produced therein, spaced apart in a horizontal line and situated adjacent the lower edge of the front plate. To the inside of the front plate, between the signal openings are pivoted a pair of semaphores or signal arms 6 and 7, as at 17, and at the outer or free ends of said signal arms is a guide flange 18 bent from the bodies and lying at right angles thereto. These guide flanges are adapted to approximately fill the space 19 within the housing between the front plate 3 and the back plate 10, so as to prevent undue backward and forward movement or rattling of the semaphores or signal arms.

Figure 2:
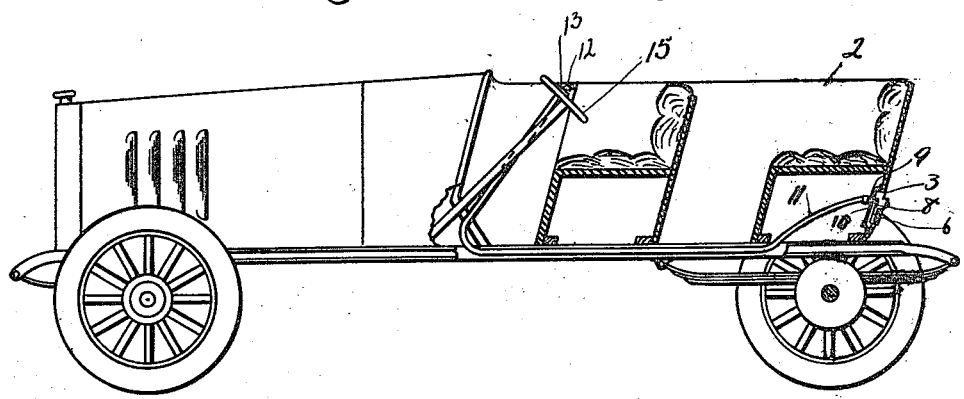
Fig. 2, is a fragmentary longitudinal sectional view thereof.
Figure 3:
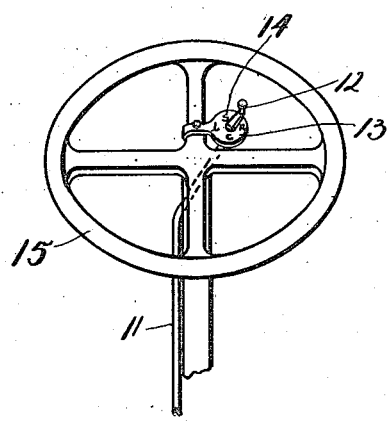
Fig. 3, is an enlarged perspective view of the steering wheel, showing one way in which the crank handle for operating the signal may be placed within easy access of the automobile operator.

The back plate 10 is preferably provided with a flange 20 entirely around the same, so as to inclose the signal arms, and this back plate is secured to the front plate in any suitable manner as by fastening means 21, such as screws and nuts. To each of the signal arms or semaphores 6 and 7 adjacent their inner upper edges is pivoted one end of a link 8 as at 22, the opposite ends of both of these links being pivoted as at 23 to the arm 24 of the crank 9, the shank 25 of said crank passing through the back plate 10 and using the same as a bearing. This crank is connected with the operating means in the same manner as shown in Fig. 2, the signal being situated in any suitable position on the outside of the vehicle, and said signal may be attached to the vehicle in any suitable and well known manner as by brackets or screws threaded directly into the vehicle.

The operation of the signal is as follows:—

When the operator intends to stop the vehicle, the crank handle 12 is turned until it alines with the proper designation mark, such as the letter S, which movement will turn the crank 9 to its lowermost position as shown in Fig. 4, through the medium of the flexible shaft, and this will move both signal arms or semaphores 6 and 7 until they are disposed across the openings 4 and 5, thereby bringing both signal arms to the view of following traffic, so that said traffic may be brought to a standstill in sufficient time to prevent an accident, thereby preventing a possible loss of life and property.

Should the operator intend to turn to the right, either for reaching the curb along the street on which he is traveling, or for proceeding to another street at an angle to the one on which he is traveling, the crank handle 12 is turned to another designation mark such as the letter R, which will move the arm 24 of the crank 9 to the right hand position as shown by the dot and dash line in Fig. 4, which movement will cause the signal arm 7 to remain across the signal opening 5, and raise the signal arm 6 to the position shown by the dot and dash line in Fig. 4 if the signal arms were originally in a stop position as shown in Fig. 4, but if the signal arms had been in a raised or proceed position as shown in Fig. 5, then the movement of the crank 9 would have caused the signal arm 7 to be moved downward across the signal opening 5 and hold the other signal arm 6 in its raised position; then again had the signal arm been down or disposed across the signal opening 5 and the signal arm 7 raised, the latter would have been lowered and the former raised through one of the intervening positions, in which either both are raised or both lowered. In the same manner the signal arm 6 may be disposed across its signal opening 4, and the signal arm 7 raised, so as not to be visible, and when in this position the signal given implies that the operator intends to turn the vehicle to the left. To produce this signal, the crank handle 12 is turned to one of the other designation marks as the letter L, when the operator of the vehicle is about to start, and while proceeding in a generally straight course, the crank handle 12 is turned to the other designation mark such as the letter G, and this movement of the crank handle from any position in which it may be, will turn the crank 9 to its uppermost position, thus raising both the semaphores or signal arms as shown by dotted lines in Fig. 5.

In actual practice it is desirable to have the outer surface of the front plate and the inner surface of the back plate in the region of the signal openings 4 and 5, of one and the same color, while the signal arms or semaphores are of a different color, as for instance, the front and back plates should have a white or light finish, while the signal arms or semaphores should have a black or dark finish or vice versa.

If found desirable a lamp 26 may be arranged adjacent the signal for throwing a light thereon, whereby the signal arms will be visible in the dark, and this lamp may be arranged in the space between the signal openings as shown in Figs. 4 and 5, and where the signal is of sufficient size it may also carry the State license tag, the front or outer plate or wall of the signal carrying bolts 27 adapted to register with suitable holes in the license tag, said license tag being held in place by nuts 28 threaded on the bolts 27.

In Fig. 10 I have shown a still further modified form of my invention in which suitable lamps or lights 29 are arranged within the signal housing, or to the rear of the signal openings, so that when the signal arms are raised, the lights will be plainly visible through said openings, which if found desirable may be covered with a piece of glass 30, which should be plain or white. The signal arms are each provided with an opening 31 across which is disposed a piece of glass 32 of some color or dark shade, such as red, so that when the signal arms or semaphores are moved across the signal openings, the rays of light from the lamps will pass through the colored glass and designate to the following traffic the intentions of the operator of the vehicle. The signal arms or semaphores are operated in the same manner as described for the other forms of my invention.

It is to be noted that the crank 9 may be turned from one position to another position in either direction, that is to the right or left, for moving the signal arms into or out of any signal position, thus making it unnecessary for the operator to stop and consider which way the crank handle 12 must be turned, or that it must be turned to some neutral position before a signal can be given.

Of course, I do not wish to be limited to the exact details of construction as herein shown, as these may be varied within the limits of the appended claims without departing from the spirit of my invention.

Having thus fully described my invention, what I claim as new and useful is—

1. A signal comprising a housing having signal openings therein, pivoted signal arms adapted to move across said openings, and means common to both arms for moving either or both of them into or out of signal position.

2. A signal comprising a housing having signal openings therein, pivoted signal arms adapted to move across said openings, a crank, and means connected with said crank and both of the arms whereby either or both of said semaphores may be moved into or out of signal position.

3. A signal comprising a housing having signal openings therein, pivoted signal arms adapted to move across said openings, a crank, and links, one end of each of which is connected with the signal arms, the opposite ends of each being connected with the crank, whereby the signal arms may be moved into or out of signal position.

4. An automobile signal comprising a housing having a pair of signal openings spaced apart on a horizontal line, a signal arm or semaphore pivoted adjacent each signal opening within the space between said openings, a crank, a bearing for said crank, and a link pivoted to each of said signal arms and to the arm of the crank, whereby either or both of said signal arms may be moved into or out of signal position.

5. An automobile signal comprising an outer or front plate having signal openings therein spaced apart on a horizontal line, an inner or back plate secured to the front plate and spaced therefrom throughout its major portion, a signal arm or semaphore pivoted to the inside of the outer or front plate in the region of the signal openings, a crank journaled in the back plate, and means for connecting the signal arms with the crank, whereby either of said signal arms may be moved into or out of signal position.

6. An automobile signal comprising an outer or front plate having signal openings therein spaced apart on a horizontal line, an inner or back plate secured to the front plate and spaced therefrom throughout its major portion, signal arms or semaphores pivoted to the inside of the outer or front plate in the region of the signal openings, a crank journaled in the back plate, and a pair of links, one end of each of which is pivoted to one of the semaphores with the opposite ends of both of the links pivoted to the crank, whereby the turning of said crank will move either or both of said signal arms into or out of signal position.

7. An automobile signal comprising a front plate provided with signal openings and having its outer face suitably colored, a back plate carried by the front plate and having its inner surface of the same color as the outer surface of the front plate, signal arms or semaphores pivoted to the front plate between the two plates and having their outer surfaces suitably colored, guide flanges carried by the outer or free ends of the signal arms, a crank journaled in the back plate, and links pivoted to said crank and to the signal arms, whereby said signal arms may be moved into or out of signal position.

8. An automobile signal consisting of a housing having signal openings therein, plain glass disposed across said openings, semaphores having openings therein pivoted within the housing so as to move across the signal openings, colored glass disposed across the openings in the semaphores, a crank, and links pivoted to the semaphores and to the crank whereby the movements of said crank will move either or both of the semaphores into or out of signal position.

9. A signal comprising a housing having signal openings therein, a signal arm pivoted adjacent each signal opening and adapted to move across its respective opening, a link connected to each signal arm and a crank common to both of the signal arms and to which both of the links are connected whereby movement of the crank to one position will move one of the signal arms across its respective signal opening, a movement of the crank to a second position will move the other signal arm across its respective signal opening, a movement of the crank to a third position will move both the signal arms across their respective signal openings and a movement of the crank to a fourth position will move both signal arms away from the signal openings.

In testimony whereof I have hereunto affixed my signature.

IRA B. TURNER.